US009479909B2

(12) United States Patent
Brooks et al.

(10) Patent No.: US 9,479,909 B2
(45) Date of Patent: Oct. 25, 2016

(54) METHOD OF SENDING MESSAGES TO DEVICES NOT CONFIGURED TO RECEIVE THEM

(71) Applicant: TigerText, Inc., Santa Monica, CA (US)

(72) Inventors: Brad Brooks, Beverly Hills, CA (US); Sumeet Bhatia, Los Angeles, CA (US); Sean Whiteley, Pacific Palisades, CA (US)

(73) Assignee: TigerText, Inc., Santa Monica, CA (US)

( * ) Notice: Subject to any disclaimer, the term of this patent is extended or adjusted under 35 U.S.C. 154(b) by 0 days.

(21) Appl. No.: 14/664,790

(22) Filed: Mar. 20, 2015

(65) Prior Publication Data
US 2015/0271653 A1    Sep. 24, 2015

Related U.S. Application Data

(60) Provisional application No. 61/955,998, filed on Mar. 20, 2014.

(51) Int. Cl.
*H04W 4/14* (2009.01)
*H04W 12/06* (2009.01)
*H04L 12/58* (2006.01)
*H04M 1/725* (2006.01)

(52) U.S. Cl.
CPC ............... *H04W 4/14* (2013.01); *H04L 51/04* (2013.01); *H04L 51/24* (2013.01); *H04W 12/06* (2013.01); *H04M 1/72547* (2013.01)

(58) Field of Classification Search
CPC .............................. H04L 51/04; H04L 51/24
See application file for complete search history.

(56) References Cited

U.S. PATENT DOCUMENTS

| | | | |
|---|---|---|---|
| 5,958,005 A | 9/1999 | Thorne et al. | |
| 6,324,569 B1 * | 11/2001 | Ogilvie | G06Q 10/107 709/206 |
| 7,191,213 B1 * | 3/2007 | Bouchard | H04L 12/1813 709/204 |
| 7,356,564 B2 | 4/2008 | Hartselle et al. | |
| 7,568,098 B2 | 7/2009 | Yeates et al. | |
| 8,364,764 B2 | 1/2013 | Hartselle et al. | |
| 8,799,369 B2 * | 8/2014 | Bishop | G06Q 10/107 709/206 |
| 2004/0260710 A1 | 12/2004 | Marston et al. | |
| 2005/0186969 A1 * | 8/2005 | Lohtia | H04W 4/14 455/456.3 |
| 2005/0198165 A1 | 9/2005 | Reddel et al. | |
| 2006/0019639 A1 | 1/2006 | Adams et al. | |
| 2008/0294586 A1 | 11/2008 | Lim | |

(Continued)

OTHER PUBLICATIONS

Messaging and Online Collaboration News, http:/www.eweek.com/c/a/Messaging-and-Collaboration/Stealth-Text-Should-You-Choose-to-Accept-It, May 22, 2012.

*Primary Examiner* — Lashonda Jacobs
(74) *Attorney, Agent, or Firm* — White and Williams LLP

(57) ABSTRACT

A system having a server for receiving a message from a sending device executing a messaging application and for sending a message notification alert to a recipient, the server having a processor and memory, the memory having computer executable code, comprising receiving the message from the sending device executing the messaging application, the message containing recipient address information provided by the sending device, determining, based on recipient address information, that the recipient is not associated with a recipient device having the messaging application, and transmitting the message notification alert to the recipient via an alternate communications method, the message notification alert comprising a link to view the message.

24 Claims, 3 Drawing Sheets

(56) References Cited

U.S. PATENT DOCUMENTS

| | | | |
|---|---|---|---|
| 2008/0294735 A1* | 11/2008 | Muntermann | H04L 12/5855 709/206 |
| 2009/0150675 A1* | 6/2009 | Cook | G06Q 10/107 713/175 |
| 2009/0254610 A1 | 10/2009 | Arthursson | |
| 2011/0126126 A1 | 5/2011 | Blair | |
| 2012/0317218 A1* | 12/2012 | Anderson | H04N 21/4786 709/206 |
| 2013/0055368 A1* | 2/2013 | Bauckman | H04L 51/24 726/7 |
| 2013/0159436 A1 | 6/2013 | Hartselle et al. | |
| 2014/0068262 A1* | 3/2014 | Robertson | H04L 63/0428 713/168 |

* cited by examiner

METHOD OF SENDING MESSAGES TO DEVICES NOT CONFIGURED TO RECEIVE THEM

This application claims the benefit of U.S. Provisional Application No. 61/955,998, filed Mar. 20, 2014, the full disclosure of which is incorporated herein by reference.

BACKGROUND

U.S. patent application Ser. Nos. 13/063,763 and 13/046,862, filed by the applicant hereof, describe a system for ephemeral messaging, whereby individuals can have conversations that "self-destruct" or disappear after a predetermined period of time, both of which are hereby incorporated by reference. As discussed in more detail therein, these messages are different from traditional electronic mail or text messaging systems, which are stored persistently.

Ephemeral messages such as those described in the above referenced patent applications are traditionally delivered over the Internet, including delivery to devices such as smartphones that also have connectivity to traditional cellular telephone networks for services such as telephone calls or Simple Message System (SMS) messages, in addition to Internet connectivity. However, unless they are built into the operating system of the device, these ephemeral message systems require both the sender and the recipient to install application software on their device in order to converse over the ephemeral message system. Installing the application can itself become problematic from a technical perspective at times when Internet connectivity is sub-optimal. Also, convincing and/or reminding a potential conversation partner to install an application before continuing a conversation can prove cumbersome or otherwise difficult, which results in the ephemeral message system not having the market penetration it might otherwise have, and causing conversation participants to use built in tools such as SMS instead, because of its universality and despite its inferiority.

Accordingly, it would be useful to permit a sender who has installed the application software for the messaging service to deliver a message via that service to the device of a user who has not done so. This would allow the ephemeral messaging system to be introduced to the new user through a sender whom they know and trust, and via a message that provides context and which they wish to read. This would also allow users who have lost or uninstalled the app to be notified of messages and present renewed incentive to reinstall the application.

SUMMARY OF THE INVENTION

A system having a server for receiving a message from a sending device executing a messaging application and for sending a message notification alert to a recipient, the server having a processor and memory, the memory having computer executable code, comprising receiving the message from the sending device executing the messaging application, the message containing recipient address information provided by the sending device, determining, based on recipient address information, that the recipient is not associated with a recipient device having the messaging application, and transmitting the message notification alert to the recipient via an alternate communications method, the message notification alert comprising a link to view the message.

DETAILED DESCRIPTION OF THE INVENTION

Figure 1:
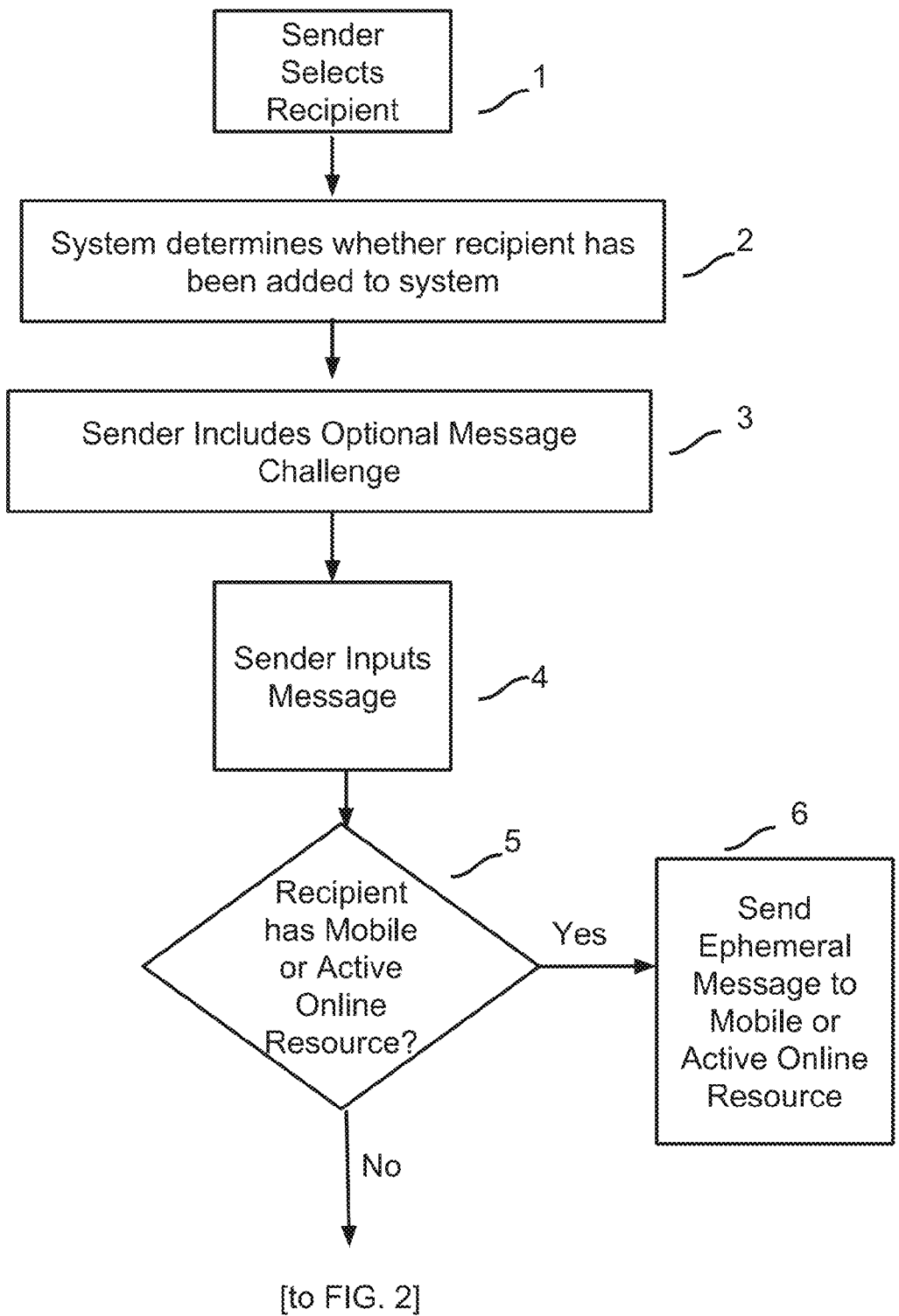
FIG. 1 is a flow chart in accordance with an aspect of the present disclosure.

Turning to FIG. 1, a process flow of a system whereby a user of an ephemeral messaging system may send a message to a person who has not installed the application for that system and/or has not signed up for an account on that system is shown. As disclosed in U.S. patent application Ser. Nos. 13/063,763 and 13/046,862, the system is a "closed messaging system" where authenticated, registered users running the application associated with the system can send and receive ephemeral messages. The system can run on resources such as desktop or mobile communications devices, such as smartphones, which run a software application designed to send and receive messages via the closed messaging system.

In step 1, the sender of the message chooses a recipient of the message. In step 2, the system determines whether the recipient is already in the directory for the messaging system and, if not, in one aspect, that contact information is added, e.g. from the sender's contacts database. In one aspect of the invention, recipient contact information may be added by an administrator, either for one recipient or for many recipients at once. In one aspect of the invention, the contact information, whether added by the sender or by an administrator, can be made available to all users of the system, however its visibility may also be restricted.

In one aspect, the web interface may include a challenge/response system. In one aspect, e.g. in an administered context such as within an enterprise, an administrator may determine that authentication is required before a user may view a message. In a different context, such as a consumer context, the sender of a message may require the user to answer a challenge question before viewing the message, as shown in step 3. The challenge may be entered by the Sender as part of the message sending process, and the Recipient would be required to correctly answer the challenge entered by the Sender before entering or viewing the conversation or seeing the message. Persons having skill in the art will understand that the challenge can be input before or after the message. In one aspect, the Sender can enter both the question and its answer. In step 4, the sender inputs the message. The sender may also input, or the system may impose, ephemeral limits on the message.

In step 5 the system determines if the recipient has a mobile resource or active online resource. In one aspect, the system checks to see if there is a mobile device on the ephemeral messaging system associated with the recipient user, e.g. a device with the system's software application installed, or an actively running desktop or web resource connected to the ephemeral messaging system. If so, the message is sent via the ephemeral messaging system to the mobile or active online resource in step 6.

Figure 2:
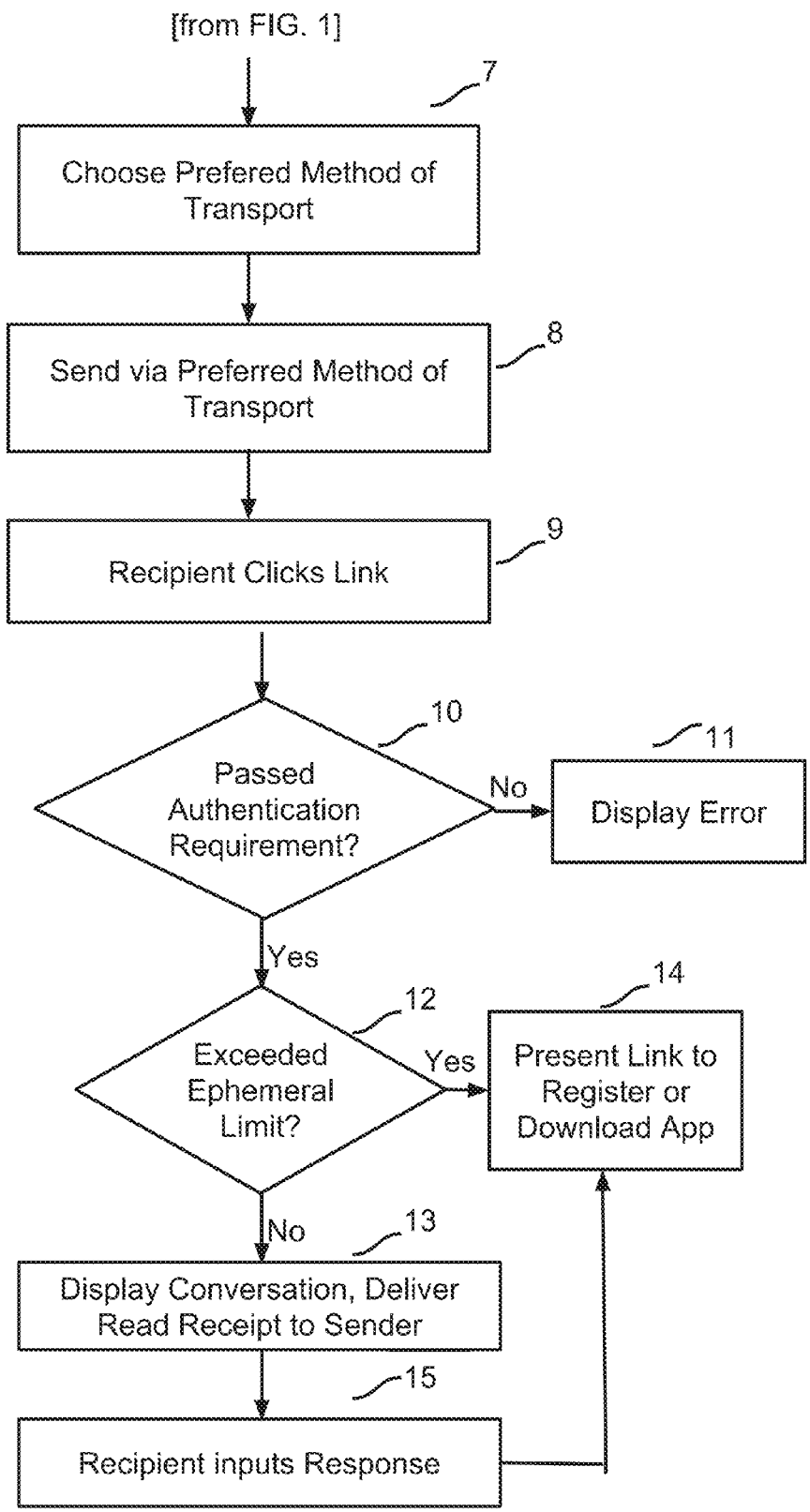
FIG. 2 is a flow chart in accordance with an aspect of the present disclosure.

Turning now to FIG. 2, if a mobile resource associated with the recipient user is not available, then in step 7 the system chooses an alternative notification via SMS, Email, or some other mode of transport that is known to be available based on the contact information available for that user in the system (e.g., internal messaging on an electronic medical records application, messaging via a social media platform, or messaging via an instant messaging platform).

In step 8, a template message is sent via the preferred method of transport as chosen in step 7. The template message is generated from a template and contains a link to a secure website where the Message Recipient can view and respond to the message, and continue interacting with the service, e.g. via a web interface. In one aspect, the template message may include the entire sent message. In another aspect, the template message may include fields of information about the message, but not the message itself, or may include some portion of the message but not the entire message. Fields may include the identity of the sender, the date and time of the message, information about the ephemeral limitations on the message which can include general or specific information, e.g., the length of time the message will be viewable to the recipient, and/or a subject of the message, which can be input by the sender.

In step 9, the Message Recipient receives the message via the selected alternative transport and selects the secure link which redirects them to a secure browser for viewing the message on their internet enabled device. In step 10, the authentication requirements for the message and/or the recipient user are tested. In one aspect, the web interface may include an ability to create an account or establish a password for delivery of future ephemeral messages via the ephemeral messaging service. This can occur with varying levels and types of authentication. In one aspect, no authentication may be necessary based on the content of the link via which the user entered the system. In one aspect, the user may be asked to create a password. In one aspect, the user may be asked to enter an existing password. In one aspect, the user may be asked to log in with credentials from another service. In one aspect, the user may be asked to answer a system-generated question based on previous information about the user, known to the system. In one aspect the user may be asked to answer a question written by the sender of the message. Persons having skill in the art will realize that one or more of these may be used in conjunction with one another. In one aspect, the system can deliver a traditional message (e.g., an e-mail or SMS message, or a message by the previously selected preferred alternate method of transport) to the user after the user creates the account, to confirm that the account has been created. If the authentication requirement fails, an error message is displayed in step 11.

In one aspect, the system and/or the sender may impose ephemeral limitations on the number of times a user can respond via the web interface without installing the application on a device and associating the instance of the application on the device with the user account. For example, the web interface may allow for read-only access to messages, may allow each account to respond only once, twice, or some other limited number of times before disabling responses. The web interface may also control the amount of time, or the number of times, a particular message may be viewed, e.g. by the web interface. In step 12, these ephemeral limits are tested, and, if the message is still permitted to be displayed, it is displayed in step 13 and the Message Sender is notified that the message is read. If not, a marketing message message to download the application to continue using the ephemeral messaging service is displayed in step 14. In step 15, in one aspect, the message recipient can enter a response to the message in a form on their web enabled device. In step 14, the Message recipient is then displayed the marketing message of step 14.

In one aspect, the invention allows for an ongoing conversation through the secure web browser, group messaging, and the sending/receiving of rich media. Ongoing conversation view allows the user to continue participating in the conversation via the web interface in real time, instead of requiring re-authentication every time a new message is received within the conversation. In one aspect, users may receive a system notification that another user in the conversation is actively reading the conversation and/or inputting a response. In one aspect, the system can continue delivering notifications via the preferred alternate method of transport for future messages in the conversation. These notifications may appear to users on their registered device, even when the user is not viewing the conversation or even active in the ephemeral messaging app. Furthermore, persons having ordinary skill in the art will understand that logic for determining the preferred method of transport can be modified and expanded to optimize for best path of reaching a recipient, and can include defined escalation procedures to use transport methods in a particular order.

Figure 3:
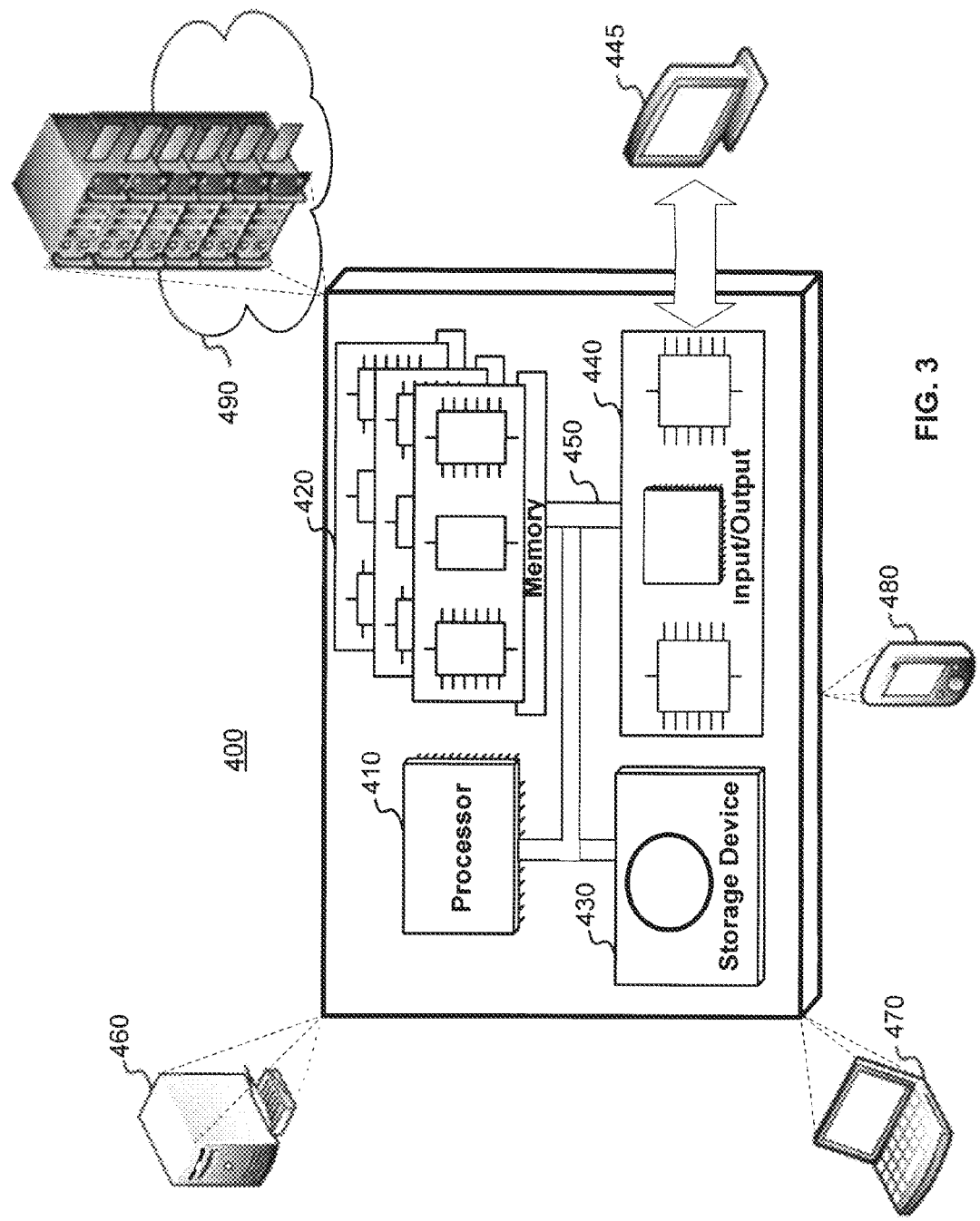
FIG. 3 is a schematic diagram depicting a representative computer system according to aspects of the present disclosure.

FIG. 3 shows an illustrative computer system 400 suitable for implementing methods and systems according to an aspect of the present disclosure. The computer system may comprise, for example, a computer running any of a number of operating systems. The above-described methods of the present disclosure may be implemented on the computer system 400 as stored program control instructions.

Computer system 400 includes processor 410, memory 420, storage device 430, and input/output structure 440. One or more input/output devices may include a display 445. One or more busses 450 typically interconnect the components, 410, 420, 430, and 440. Processor 410 may be a single or multi core.

Processor 410 executes instructions in which aspects of the present disclosure may comprise steps described in one or more of the Figures. Such instructions may be stored in memory 420 or storage device 430. Data and/or information may be received and output using one or more input/output devices.

Memory 420 may store data and may be a computer-readable medium, such as volatile or non-volatile memory, or any non-transitory storage medium. Storage device 430 may provide storage for system 400 including fir example, the previously described methods. In various aspects, storage device 430 may be a flash memory device, a disk drive, an optical disk device, or a tape device employing magnetic, optical, or other recording technologies.

Input/output structures 440 may provide input/output operations for system 400. Input/output devices utilizing these structures may include, for example, keyboards, displays 445, pointing devices, and microphones—among others. As shown and may be readily appreciated by those skilled in the art, computer system 400 for use with the present disclosure may be implemented in a desktop computer package 460, a laptop computer 470, a hand-held computer, for example a tablet computer, personal digital assistant, mobile device, or smartphone 480, or one or more server computers that may advantageously comprise a "cloud" computer 490.

What is claimed is:

1. A system capable of receiving a message from a sending device executing a messaging application and capable of sending a message notification alert to a recipient, comprising:

a message server comprising a processor and memory that stores computer executable code instructing the processor to perform steps comprising:

a. receiving the message from the sending device executing the messaging application, the message containing recipient address information provided by the sending device;

b. determining, based on recipient address information, whether the recipient is associated with a recipient device having the messaging application;

c. if the recipient is associated with a recipient device having the messaging application, transmitting the message to be received via the messaging application; and d. if the recipient is not associated with a recipient device having the messaging application, transmitting the message notification alert to the recipient via an alternate communications method other than via the messaging application, the message notification alert comprising a link to view the message.

2. The system of claim 1, wherein the message notification alert further comprises a field of information relating to the message.

3. The system of claim 2, wherein the field comprises information relating to ephemeral limitations on reading the message.

4. The system of claim 2, wherein the field comprises one or more of a sender indicator and a recipient indicator.

5. The system of claim 1, wherein the alternate communications method is an SMS messaging method.

6. The system of claim 1, wherein the alternate communications method is an email messaging method.

7. The system of claim 1, wherein the link is to a web based interface supplied by the message server.

8. The system of claim 7, wherein the message can be viewed by the recipient via only the web based interface, the messaging application, or both the web based interface and the messaging application.

9. The system of claim 7, wherein the web based interface allows the recipient to communicate in real-time with the sending device via the message server.

10. The system of claim 9, wherein a conversation comprises a plurality of messages from the sending device or from the recipient in a single view.

11. The system of claim 9, wherein the sending device may send a second message in a conversation and wherein a second message notification alert, relating to the second message, is sent via the alternate communications method.

12. The system of claim 7, wherein the web based interface ends access to the message by the recipient after a specified number of views of the message via the web interface.

13. The system of claim 7, further comprising receiving an authentication requirement, and restricting access by the recipient to the message until the authentication requirement is met by the recipient.

14. The system of claim 7, wherein the web based interface further comprises an invitation to the recipient to download the messaging application.

15. A system capable of receiving a message from a sending device executing a messaging application and capable of sending a message notification alert to a recipient, comprising:

a message server comprising a processor and memory that stores computer executable code instructing the processor to perform steps comprising:

a. receiving the message from the sending device executing the messaging application, the message containing recipient address information provided by the sending device;

b. determining, based on recipient address information, whether the recipient is associated with a recipient device having the messaging application;

c. if the recipient is associated with a recipient device having the messaging application, transmitting the message to be received via the messaging application; and d. if the recipient is not associated with a recipient device having the messaging application transmitting the message notification alert to the recipient via an alternate communications method other than via the messaging application, the message notification alert comprising a link to view the message, wherein the link is to a web based interface supplied by the message server allowing the sending device and recipient to participate in a real-time conversation and wherein the conversation comprises a plurality of messages from the sending device or from the recipient in a single view.

16. The system of claim 15, wherein the web based interface ends access to the message by the recipient after a specified number of views of the message via the web interface.

17. The system of claim 15, further comprising receiving an authentication requirement, and restricting access by the recipient to the message until the authentication requirement is met by the recipient.

18. The system of claim 15, wherein the web based interface further comprises an invitation to the recipient to download the messaging application.

19. The system of claim 15, wherein the message notification alert further comprises a field of information relating to the message.

20. The system of claim 19, wherein the field comprises information relating to ephemeral limitations on reading the message.

21. The system of claim 19, wherein the field comprises one or more of a sender indicator and a recipient indicator.

22. The system of claim 15, wherein the sending device sends a second message in the conversation and wherein a second message notification alert, relating to the second message, is sent via the alternate communications method.

23. The system of claim 15, wherein the alternate communications method is an SMS messaging method.

24. The system of claim 15, wherein the alternate communications method is an email messaging method.

* * * * *